(12) United States Patent
Oteri et al.

(10) Patent No.: US 9,295,003 B2
(45) Date of Patent: Mar. 22, 2016

(54) RESOURCE ALLOCATION IN A COMMUNICATION SYSTEM

(75) Inventors: Oghenekome F. Oteri, Austin, TX (US); James W. McCoy, Austin, TX (US)

(73) Assignee: Apple Inc., Cupertino, CA (US)

( * ) Notice: Subject to any disclaimer, the term of this patent is extended or adjusted under 35 U.S.C. 154(b) by 1294 days.

(21) Appl. No.: 11/725,423

(22) Filed: Mar. 19, 2007

(65) Prior Publication Data
US 2008/0233992 A1    Sep. 25, 2008

(51) Int. Cl.
*H04B 1/00*    (2006.01)
*H04B 7/00*    (2006.01)
(Continued)

(52) U.S. Cl.
CPC ............ *H04W 52/18* (2013.01); *H04W 52/241* (2013.01); *H04W 52/262* (2013.01);
(Continued)

(58) Field of Classification Search
CPC . H04W 52/146; H04W 52/18; H04W 52/241; H04W 52/262; H04W 52/346; H04W 52/365; H04W 52/367; H04W 72/04; H04W 52/24; H04W 52/265; H04W 52/267; H04W 72/0413; H04W 72/0453; H04W 72/0473; H04W 72/048; H04W 72/0493; H04W 72/12; H04W 72/121; H04W 72/1263; H04W 72/1268; H04W 72/1284; H04W 72/1289; H04W 16/10; H04W 74/08; H04W 28/14; H04W 48/20; H04W 52/12; H04W 52/54; H04W 72/1278; H04W 72/14; H04W 52/08; H04W 52/287; H04W 52/34; H04W 52/44; H04W 52/50; H04L 1/0002; H04L 12/1457; H03M 13/2906; H03M 13/353; H04M 15/765; H04M 17/20; H04M 17/204

USPC ........... 375/260, 267, 340, 347; 455/13.4, 68, 455/69, 84, 115.3, 127.1, 127.2, 127.5, 134, 455/136, 137, 138, 404.2, 405, 418, 419, 455/420, 515, 522, 572, 574; 370/236, 252, 370/278, 280, 282, 318, 328, 329, 331, 332, 370/336, 337, 350, 346, 395.5, 342, 474

See application file for complete search history.

(56) References Cited

U.S. PATENT DOCUMENTS 5,982,760 A    11/1999  Chen
5,995,496 A *  11/1999  Honkasalo et al. ........... 370/318
(Continued)

FOREIGN PATENT DOCUMENTS

EP    1357681 A1    10/2003
JP    2002539707    11/2002
(Continued)

OTHER PUBLICATIONS

3GPP TSG-RAN WG1 #48, Qualcomm Europe, Uplink inter-cell Interference Management, Feb. 12-16, 2007, R1-071099.
(Continued)

*Primary Examiner* — Yuwen Pan
*Assistant Examiner* — Paul P Tran
(74) *Attorney, Agent, or Firm* — Meyertons, Hood, Kivlin, Kowert & Goetzel, P.C.

(57) ABSTRACT

Methods and corresponding systems for determining a transmit power in a mobile device include receiving, in the mobile device, a cell-wide power control parameter related to a target receive power at a serving base station. Thereafter, a transmit power is calculated in response to the cell-wide power control parameter and an implicit mobile-specific power control parameter. The mobile device then transmits using the transmit power. The cell-wide power control parameter can be a cell target signal to interference-plus-noise ratio, or a fractional power control exponent. The implicit mobile-specific power control parameter can be a modulation and coding level previously used by the mobile device, or a downlink SINR level measured by the mobile device.

11 Claims, 4 Drawing Sheets

(51) Int. Cl.

| | | |
|---|---|---|
| *H01Q 11/12* | (2006.01) | |
| *H04B 1/04* | (2006.01) | |
| *H04W 72/00* | (2009.01) | |
| *H04M 1/00* | (2006.01) | |
| *H04B 1/38* | (2015.01) | |
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04B 7/185* | (2006.01) | |
| *H04W 4/00* | (2009.01) | |
| *H04B 7/216* | (2006.01) | |
| *H04K 1/10* | (2006.01) | |
| *H04L 27/28* | (2006.01) | |
| *H04W 52/18* | (2009.01) | |
| *H04W 52/24* | (2009.01) | |
| *H04W 52/26* | (2009.01) | |
| *H04W 52/36* | (2009.01) | |
| *H04W 52/54* | (2009.01) | |
| *H04W 52/14* | (2009.01) | |

(52) U.S. Cl.
CPC ............ *H04W52/365* (2013.01); *H04W 52/54* (2013.01); *H04W 52/146* (2013.01); *H04W 52/247* (2013.01)

(56) References Cited

U.S. PATENT DOCUMENTS

| | | | |
|---|---|---|---|
| 6,154,450 | A | 11/2000 | Wallentin et al. |
| 6,216,010 | B1 | 4/2001 | Edwards et al. |
| 6,285,665 | B1 | 9/2001 | Chuah |
| 6,341,225 | B1 | 1/2002 | Blanc |
| 6,519,705 | B1 | 2/2003 | Leung |
| 6,615,054 | B2 | 9/2003 | Terry et al. |
| 6,628,633 | B1* | 9/2003 | Mochizuki .................... 370/335 |
| 6,836,666 | B2 | 12/2004 | Gopalakrishnan et al. |
| 6,850,771 | B2 | 2/2005 | Malladi et al. |
| 6,950,632 | B1 | 9/2005 | Yun et al. |
| 6,952,591 | B2 | 10/2005 | Budka et al. |
| 7,023,824 | B2* | 4/2006 | Khullar ........................ 370/337 |
| 7,031,741 | B2* | 4/2006 | Lee et al. ..................... 455/522 |
| 7,209,749 | B2* | 4/2007 | Kwak et al. ................ 455/452.2 |
| 7,486,961 | B2* | 2/2009 | Lee et al. ..................... 455/522 |
| 7,542,776 | B2* | 6/2009 | Umesh et al. ................ 455/522 |
| 8,310,929 | B1 | 11/2012 | Srinivas et al. ............... 370/232 |
| 2003/0064744 | A1* | 4/2003 | Zhang et al. ................. 455/522 |
| 2005/0004970 | A1* | 1/2005 | Jain et al. ..................... 709/200 |
| 2005/0014524 | A1* | 1/2005 | Lott ......................... H04W 72/08 455/522 |
| 2005/0047344 | A1* | 3/2005 | Seol ............................. 370/329 |
| 2006/0034165 | A1* | 2/2006 | Levy ............................ 370/208 |
| 2006/0203724 | A1 | 9/2006 | Ghosh et al. |
| 2006/0291393 | A1* | 12/2006 | Teague et al. ................ 370/235 |
| 2007/0042754 | A1* | 2/2007 | Anderson .................... 455/450 |
| 2008/0096524 | A1* | 4/2008 | True et al. .................... 455/406 |
| 2008/0151797 | A1* | 6/2008 | Camp ........................... 370/311 |
| 2008/0151819 | A1* | 6/2008 | Bachl et al. .................. 370/329 |
| 2008/0254804 | A1* | 10/2008 | Lohr et al. .................... 455/442 |
| 2009/0097444 | A1* | 4/2009 | Lohr et al. .................... 370/329 |
| 2010/0128663 | A1* | 5/2010 | Kuroda ................. H04L 1/0007 370/328 |

FOREIGN PATENT DOCUMENTS

| | | |
|---|---|---|
| JP | A 2010-508785 | 3/2010 |
| KR | 1020030084154 | 11/2003 |
| WO | WO 2005/011212 | 2/2005 |

OTHER PUBLICATIONS

3GPP TSG RAN WG1#48, Texa Instruments, Intra-Cell UL Power Control Throughput of FPC vs Classic Open-Loop, Feb. 12-16, 2007, R1-70743.
3GPP TSG RAN WG1 #48, NTT DoCoNo, NEC, Panasonic, Sharp, Toshiba, Transmission Power Control in E-utra, Uplink, R1-070870, Feb. 12-16, 2007.
3GPP TSG RAN WG1 #48, Nokia, Power Control email discussion summary, Feb. 12-16, 2007, R1-071009.
3GPP TSG RAN WG1 #48, Motorola, Power control of Uplink Control Channels and Sounding RS, Feb. 12-16, 2007, R1-071066.
International Search Report and Written Opinion for correlating PCT Patent Application No. PCT/US2008/054823 dated Aug. 12, 2008.
Alcatel-Lucent: "Fractional Power Control using Pilot Power Ratio Measurements for the E-UTRA Uplink", 3GPP Draft; R1-071074, 3rd Generation Partnership Project (3GPP), Mobile Competence Centre ; 650, Route Des Lucioles ; F-06921 Sophia-Antipolis Cedex, France, vol. RAN WG1, no. St. Louis, USA; 20070206, Feb. 6, 2007, XP050105066, [retrieved on Feb. 6, 2007], paragraphs [0001], [0002], [0004].
Khan F: "A time-orthogonal CDMA high-speed uplink data transmission scheme for 3G and beyond", IEEE Communications Magazine, IEEE Service Center, Piscataway, US, vol • 43, No. 2. Feb. 1, 2005, pp. 88-94, XP011126670, ISSN: 0163-6804, DOI: 10.1109/MCOM.2005.1391506, p. 90—right-hand column, p. 91, paragraph Uplink Scheduling and Control Signaling—paragraph Downlink Control Signaling.
Philips: "Content of Unsynchronised RACH Preamble Message", 3GPP Draft; R2-062937, 3rd Generation Partnership Project (3GPP), Mobile Competence Centre; 650, Route Des Lucioles, F-06921 Sophia-Antipolis Cedex, France, vol. RAN WG2, no. Seoul, Korea; 20061005, Oct. 5, 2006, XP050132454, [retrieved on Oct. 5, 2006], paragraphs [0001], [0002].
Office Action from Chinese Application No. 201210188578.5, issued Dec. 9, 2014, English and Chinese versions, pp. 1-16.
Final Office Action from Japanese Application No. 2013173756, issued Jan. 9, 2015, English and Japanese versions, pp. 1-11.
"Discussion on uplink power control", Samsung, 3GPP TSG RAN WG1 Meeting #47bis, Jan. 2007, pp. 2-3.
"Uplink power control for E-UTRA", Motorola, 3GPP TSG RAN1 #48, Feb. 2007, pp. 2-5.
Office Action, Chinese Application No. 201210188578.5, mailed Jul. 13, 2015, 9 pages.
Office Action from Korean Application No. 10-2009-7020506, issued Apr. 22, 2015, English and Korean versions, pp. 1-5.
Notice of Allowance from Korean Application No. 10-2014-7018139, issued Apr. 21, 2015, Korean version, pp. 1-2.
Office Action from Korean Application No. 10-2014-7018141, issued Apr. 22, 2015, English and Korean versions, pp. 1-5.
Office Action from Korean Application No. 10-2014-7018142, issued Apr. 21, 2015, English and Korean versions, pp. 1-5.
Office Action, Korean Application No. 10-2014-7035672, mailed Aug. 31, 2015, 8 pages.

* cited by examiner

RESOURCE ALLOCATION IN A COMMUNICATION SYSTEM

BACKGROUND

1. Field

This disclosure relates generally to communication systems and equipment, and more specifically to techniques and apparatus for allocating communication system resources to mobile devices in the communication system.

2. Related Art

Many wireless communication systems use base stations to communicate with one or more mobile devices (i.e., user equipment or "UE") within a cell served by the base station. Data sent from the base station to the user equipment is transmitted through a wireless channel referred to as a downlink channel, and data transmitted from the user equipment to the base station is transmitted through a wireless channel referred to as an uplink channel.

The wireless communication system has limited resources that can be allocated to the mobile devices and normally attempts to do the allocation in order to maximize the use of the bandwidth available in the uplink and downlink channels. For example, a frequency, or set of frequencies, is a resource that can be allocated to the mobile device to use for wireless transmission or reception. A time for transmission, or a transmission "time slot," is also a resource that can be allocated to the mobile device to use for wireless transmission or reception.

With regard to transmitting on the uplink channel, transmit power is a resource that can be allocated to the mobile device to use for wireless transmission. The proper allocation of transmit power is needed so that the base station receives relatively even power levels across the spectrum used by the mobile devices. Proper transmit power allocation also helps to avoid interference with transmissions from other mobile devices, whether those other mobile devices are in the same cell or an adjacent cell.

Power received at the base station can be affected by the distance between the mobile device and the base station, and other types of pathloss between the mobile and base. Distance-dependent path loss reduces the power of the receive signal because of the distance the signal travels. In addition, power can be reduced through shadowing, which occurs when an object comes between the mobile device and base station. For example, if a person with a mobile device walks down a street and a building comes between the mobile device and that base station, pathloss increases due to shadowing.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
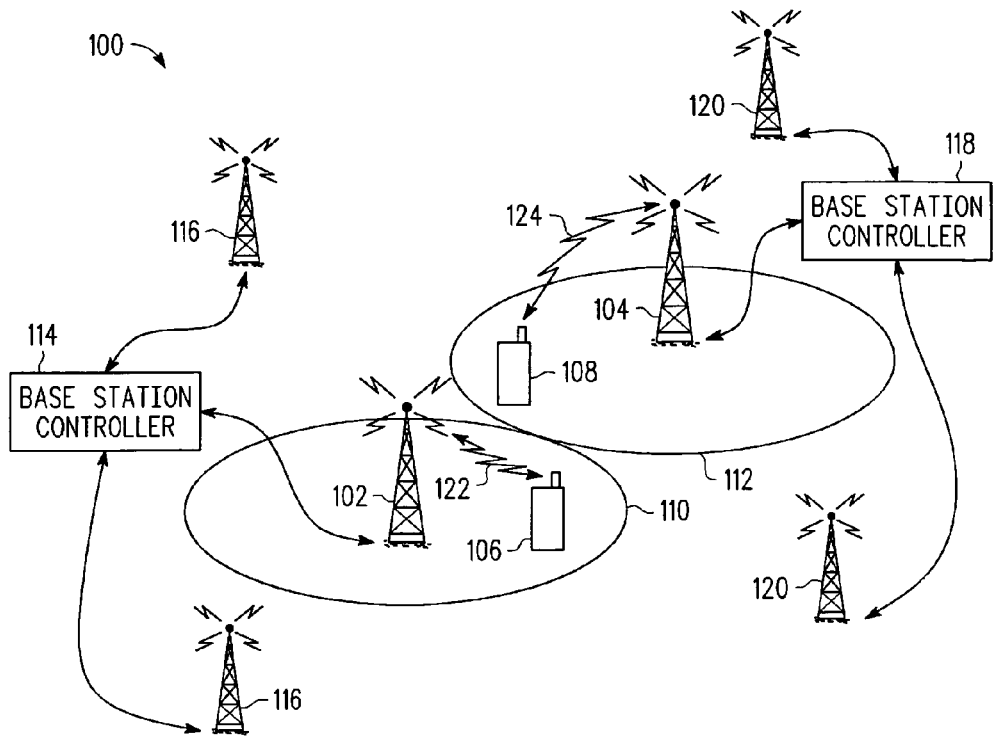
FIG. 1 is a high-level block diagram of a wireless communication system in accordance with one or more embodiments.

FIG. 1 is a high-level diagram of portions of a communication system 100 in accordance with one or more embodiments. Communication system 100 can be a wireless communication system or other similar communication system that uses power control techniques and algorithms to control a transmit power of one or more devices transmitting data. As illustrated, FIG. 1 includes base stations 102 and 104 and mobile devices 106 and 108, which mobile devices can also be referred to as mobile stations, subscriber units, mobile terminals, or user equipment (UE). Base station 102 generally communicates wirelessly with mobile devices in cell 110, while base station 104 generally communicates wirelessly with mobile devices in cell 112. Base station controller 114 (which in some embodiments can be referred to as an eNode-B or an evolved node-B) is coupled to base station 102, and perhaps other base stations 116, in order to control the operation of base station 102 and other base stations. In various embodiments, base station controller 114 can perform packet scheduling functions, connection mobility control, load balancing, inter Radio-Access-Technology handover, and the like. Similarly, base station controller 118 is coupled to base station 104, and perhaps other base stations 120, for the purpose of controlling base station 104. The base station controllers can be coupled to base stations via a communication link that can be wireless, wireline, fiber optic, or the like. In some embodiments, the base station controller can be co-located with a base station.

In one embodiment, communications system 100 can be implemented according to the specification for the long-term evolution (LTE) project within the Third Generation Partnership Project (3GPP) wireless system, which is essentially a wireless packet data system that can transmit voice (e.g., VoIP) and other data.

Mobile device 106 can communicate with base station 102 via wireless communication link 122. Mobile device 108 can communicate with base station 104 via wireless communication link 124. When mobile device 106 is near the edge of its serving cell 110, and also near another mobile device 108, which is near the edge of its serving cell 112, interference 126 from mobile device 108 can interfere with transmissions from mobile device 106 in wireless communications link 122, particularly when mobile device 106 and mobile device 108 have been assigned the same transmission frequency.

In each cell 110 and 112, the base station (e.g., base stations 102 and 104) can simultaneously receive uplink transmissions from a plurality of mobile devices, such as mobile device 106 and others not shown. In some embodiments, the base station is adapted to receive the wireless uplink transmissions with receive signal strengths that are substantially the same. To make the receive signal strengths substantially the same, an uplink transmit power control algorithm can be used to control the transmit power of each mobile device. In one embodiment, the base station can broadcast a cell-wide power control parameter to all mobile devices in the cell served by the base station. For example, in one embodiment, base station 102 can broadcast, to all mobile devices (e.g., mobile device 106) served by base station 102, a cell-wide target for received power (i.e., a power control parameter) that is related to the signal to interference-plus-noise ratio (SINR) received at the base station.

In another embodiment, the cell-wide power control parameter can be a fractional power control exponent. The fractional power control exponent can be represented as the symbol "α" in Equation 1, below:

$$\text{mobile\_station\_power}_i = P\text{max} \times \min(1, \max(R_{min}, (PL_i/PL_{xile})^\alpha))$$ (Eqn. 1)

where mobile_station_power$_i$ is the power calculated by the ith mobile in the cell, $PL_{xile}$ is the x-percentile of the path-loss from all mobiles in the cell to the base station, $R_{min}$ is the minimum power reduction ratio, and $PL_i$ is the path loss from the mobile device (or UE) in question to the base station. Using equation 1 above, with $0<\alpha<1$, mobile devices at the center of the cell have lower thresholds than those at the edges of the cell, resulting in less interference in the network.

Figure 2:
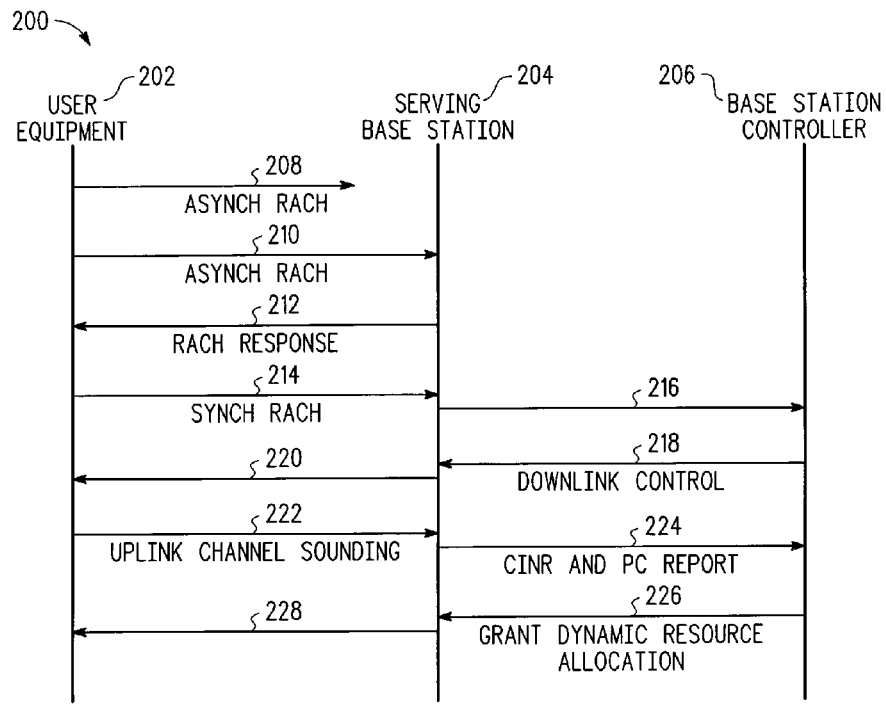
FIG. 2 is a high-level bounce diagram depicting messages sent between various components of wireless communication system of FIG. 1 in accordance with one or more embodiments.

Referring now to FIG. 2, there is depicted a "bounce diagram" illustrating messages communicated between various components of communication system 100. As depicted, messages are communicated between mobile device 202, serving base station 204, and base station controller 206. Base station controller 206 can be implemented with base station controller 114, as shown in FIG. 1. Although base station 204 and base station controller 206 are shown separately, they may or may not be physically co-located, depending upon the system.

Before a mobile device has been synchronized (e.g., when the mobile device is in the idle mode), the mobile device can initiate communication with the serving base station by sending an asynchronous RACH 208 (i.e., an asynchronous random access channel message). The random access channel is typically shared by all mobile devices in a cell served by the base station. Asynchronous RACH 208 preamble can tell base station 204 that mobile device 202 has a message for the base station. A request for service on the random access channel can be referred to as a "RACH request."

Asynchronous RACH 208 is initially transmitted at a relatively low power to avoid excessive interference. Therefore, asynchronous RACH 208 may not be received by base station 204. If asynchronous RACH 208 is not received by base station 204, there will be no response by base station 204, and mobile device 202 will resend asynchronous RACH 210 at an incrementally higher power level so that the asynchronous RACH is eventually received by base station 204, Upon reception of asynchronous RACH 210, base station 204 can respond by sending RACH response 212. RACH response 212 can include a message from base station 204 that acknowledges mobile device 202 and further instructs mobile device 202 with regard to signal timing, transmit power, and a time and frequency to use for a next uplink transmission. As an example, RACH response 212 can contain instructions to mobile device 202 to adjust the timing of its transmission by +1.04 µS, to adjust transmit power by −2 dB, and to send a synch RACH (i.e., a synchronous RACH message) at a particular start frequency, with a particular number of frequencies, and within a particular time interval.

After receiving RACH response 212, mobile device 202 can respond with a synch RACH message 214 that indicates that the mobile device is requesting a service from the base station. Additionally, mobile device 202 can use a part or segment of the message to indicate that it has a resource utilization limitation, if such a resource utilization limitation exceeds a limitation threshold for reporting to the base station.

In one embodiment, the mobile device resource utilization limitation can be a limit to the number of resource blocks that can be used during an uplink transmission relative to a current power level and current modulation and encoding scheme (MCS). In another embodiment, the mobile device resource utilization limitation can be an amount of remaining power (e.g., a power headroom) that can be used for uplink transmission. Thus, in one embodiment, synch RACH message 214 can indicate that the mobile device has a file to be transferred (i.e., requesting file transfer services), and that the mobile device is power limited to 4 resource blocks (i.e., the mobile device resource utilization limitation indicates that the mobile device should not be assigned more than 4 resource blocks, taking into consideration the current transmit power, the maximum transmit power of the mobile device, and the current modulation and coding scheme).

Note that the resource utilization limitation must exceed a limitation threshold before the limit is reported to the base station. This limitation threshold for reporting should be set at a point where device resource utilization limitations are reported when there is a likelihood that an uplink scheduler will schedule an uplink transmission that exceeds the capacity of the mobile device. When the mobile device sends a mobile device resource utilization limitation message, the base station (or other uplink traffic scheduling entity) can use this information to intelligently schedule uplink traffic in a way that does not exceed the transmit power capabilities of the mobile device. For example, if base station 204 decides to allocate a number of resource blocks greater than the number of blocks that the mobile device has indicated as a limit, the base station can scale back the modulation and coding scheme so that the mobile device can transmit a requested power on all the assigned resource blocks.

Figure 3:
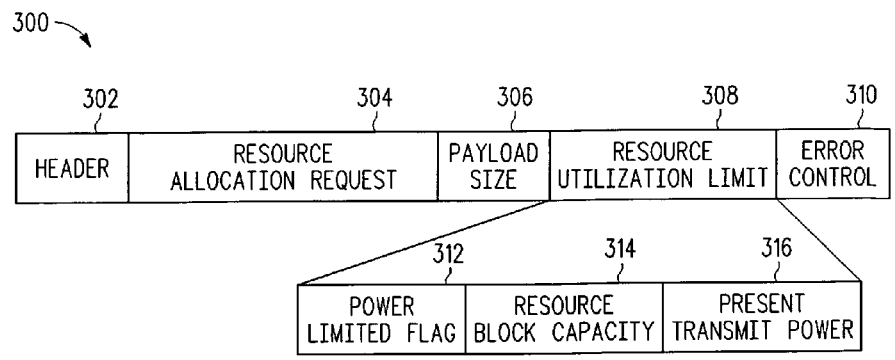
FIG. 3 is a representation of a message format in accordance with one or more embodiments.

With regard to the format of the synch RACH message 214, FIG. 3 shows an example of one embodiment of the format of the message. As illustrated, message 300 can include header 302, a service request 304, a service request parameter 306, an optional mobile device resource utilization limitation 308, and an error control field 310. Header 300 can be used to indicate the type of message. Service request 304 can be a field for indicating a request for a service from the base station serving the mobile device. Such a request for service can include a request to transfer a file, a request to place a voice call, a request for email delivery, a request for downloading music or video clips, or the like. Service request parameter 306 can contain information related to the service request, such as a file size for the file transfer, or other similar information needed to complete the service request.

If the threshold for reporting the mobile device utilization limitation has been exceeded, the mobile device resource utilization limitation 308 portion of synch RACH message 214 can include a power limited flag 312 that indicates whether it is possible for the mobile device to be scheduled for an uplink communication in a manner that exceeds its power capability. For example, if the flag is set it can indicate that the mobile device is currently operating at a power that is close to its maximum power, which implies that the base station could schedule an uplink transmission for the mobile device that would exceed its power transmission capacity. If the current power of a transmission is 21 dB, and the maximum power transmission is 24 dB, there is a chance that the base station would schedule the mobile device for uplink transmission using four resource blocks, which would require an additional 6 dB of power when only 3 dB of additional power is available before the mobile device reaches maximum power. In this case where base station 204 would like to schedule 4 resource blocks for mobile device 202, base station 204 can either limit the maximum number of resource blocks to 2, or base station 204 can schedule 4 resource blocks and assume that mobile device 202 will scale the transmit power by 2 (i.e., reduce the power by ½) and use all 4 resource blocks. Note that base station 204 can schedule a number of resource blocks exceeding the number of resource blocks reported in the mobile device resource utilization limitation 308, because the mobile device can be a better candidate for scheduling than other mobile devices.

In addition to the power limited flag 312, mobile device resource utilization limitation field 308 can include a field to indicate resource block capacity 314. Resource block capacity field 314 can indicate a maximum number of resource blocks the mobile device can use, or the field can indicate a number of additional blocks that can be used by the mobile device. Present transmit power field 316 can be used to indicate the present transmit power of the mobile device. If mobile device sends the present transmit power to the base station, the base station can calculate the maximum number of resource blocks that can be used by the mobile device, or the number of additional blocks that can be used by the mobile device. Embodiments of mobile device resource limit field 308 can include power limited flag 312 and either resource block capacity 314 or present transmit power 316, or both.

Mobile device resource utilization limitation field 308 can also indicate other limitations of the mobile device. For example, many mobile devices can transmit using one of many different levels of modulation and coding schemes (MCS). If a mobile device does not have all the levels, or if some levels are unavailable because of low battery (or other similarly limiting condition), or because the mobile device is not a full-featured device that implements all the MCS levels, then mobile device resource utilization limitation field 308 can inform the scheduler of these limitations so that a mobile device is not scheduled to perform an uplink transmission that it cannot accomplish.

In FIG. 2, after the mobile device sends synch RACH message 214 to serving base station 204, the message is forwarded to base station controller 206 as shown at 216. Base station controller 206 can respond with downlink control message 218 sent to serving base station 204, and forwarded to mobile device 202 as shown at 220, wherein the downlink control message instructs mobile device 202 to sound out the channel at a particular time and frequency. Mobile device 202 can respond by sending an unlink channel sounding message 222, where the mobile device transmits known codes or data (e.g., a known data sequence) on a set of subcarriers which are more or less evenly distributed across the channel bandwidth. In some embodiments, the known codes can be pilot sequences embedded in the uplink data channel. Channel sounding is a process for characterizing a channel between the base station and the mobile device. The channel can be characterized by calculating the channel impulse response.

After uplink channel sounding message 222 has been received by base station 204, base station 204 prepares a carrier to interference-plus-noise ratio (CINR) and power control (PC) report 224, which is then forwarded to base station controller 206. CINR is a measurement of signal effectiveness, expressed in decibels (dBs). The carrier is the desired signal, and the interference can include noise, co-channel interference, or other channel interference, or all of these. In order for the signal receiver to decode the signal, the signal must fall into an acceptable CINR range. Co-channel interference is more of a problem when frequencies are reused at short distances. In embodiments where channel sounding is not used in the system, base station 204 can infer the CINR from long term tracking of the channel through the reference symbols of the data channel.

After receiving any mobile device resource utilization limitation, and any mobile-specific power control parameters, such as the data resulting from a channel sounding, base station controller 206 can prepare and send to base station 204 a grant for a resource allocation 226. Grant for resource allocation 226 is then forwarded to mobile device 202 as shown at 228.

The grant for resource allocation 226 can either be a grant for a dynamic resource allocation or a grant for a persistent resource allocation. A grant for a dynamic resource allocation is a relatively short term grant that includes a one-time power control instruction for use during the duration of the dynamic resource allocation grant. A grant for a persistent resource allocation is a longer term grant that includes a power control instruction for initial use during the dynamic resource allocation grant, and subsequent power control instructions received periodically during the duration of the persistent resource allocation grant.

Figure 4:
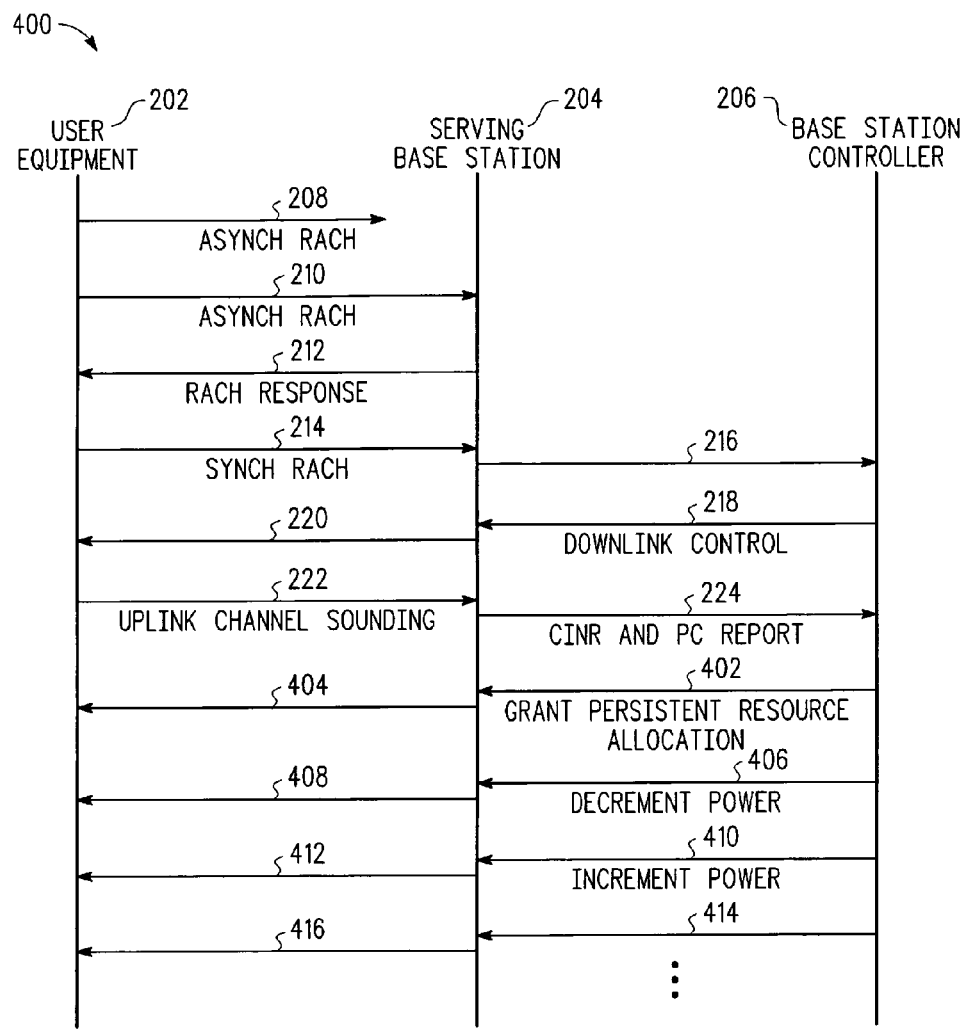
FIG. 4 is a high-level bounce diagram depicting messages sent between various components of wireless communication system of FIG. 1 in accordance with one or more embodiments.

FIG. 4. is a bounce diagram that depicts messages sent between mobile device 202, serving base station 204, and base station controller 206, resulting in a grant of a persistent resource allocation in accordance with one or more embodiments. Messages and data communication 208 through 224 are similar to those discussed above with reference to FIG. 2. In this example, synch RACH 214 can include a request for a base station service that is best suited for a persistent resource allocation grant. For example, synch RACH 214 can include a request for a voice call. Persistent resource allocation grant 402 is sent from base station controller 206 to base station 204, and then forwarded to mobile device 202 as shown at 404. Persistent resource allocation grant 402 can contain a power control instruction for initial use during the persistent resource allocation grant. Subsequent power control instructions can be sent from base station controller 206, to base station 204, and to mobile device 202. For example, after a period of time decrement power instruction 406 follows persistent resource allocation grant 402. Decrement power instruction 406 is forwarded to mobile device 202 as shown at 408 to instruct mobile device 202 to reduce its power by a predetermined incremental amount. Following power control instruction 406 are additional periodic power control instructions 410 and 414, which are forwarded to mobile device 202 has shown at 412 and 416, respectively, for the duration of the persistent resource allocation grant.

Thus, following a dynamic resource allocation grant 226, mobile device 202 operates in a mode wherein additional power control instructions are not expected from base station 204. Following a persistent resource allocation grant 402, mobile device 202 operates in a mode wherein additional power control instructions are expected from base station 204 for the duration of the persistent resource allocation.

Figure 5:
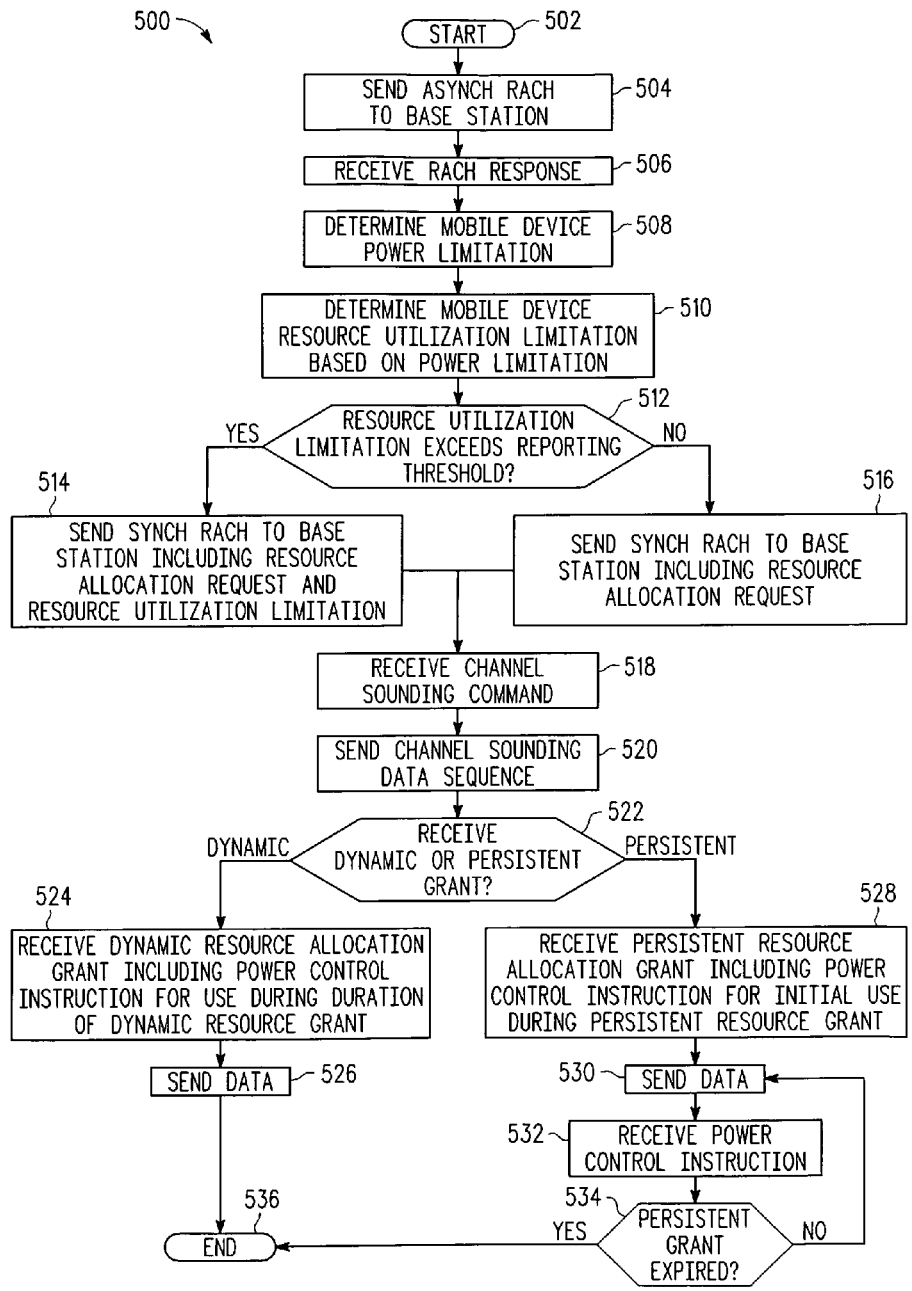
FIG. 5 is a high-level flowchart depicting a process that can be executed by a mobile device in accordance with one or more embodiments.

FIG. 5 shows a high-level flowchart of processes that can be executed by mobile device 106 in FIG. 1, or other systems with appropriate functionality, in accordance with one more embodiments. As shown, the process begins at 502, and thereafter continues at 504 wherein the process sends an asynchronous RACH to the base station. The asynchronous RACH message (such as asynchronous RACH message 208, 210 in FIG. 2.) can be sent from an idle mobile device (e.g. mobile device 106) to the base station (e.g. base station 102) to alert the base station that the mobile device has a message for the base station.

Next, the process receives a RACH response from the base station, as illustrated at 506. The RACH response acknowledges the transmission from the mobile device, and can further instruct the mobile device to adjust its transmission timing and its transmit power, and to respond with a synchronous RACH at a particular time slot and on a particular frequency (e.g., a set of frequencies or resource block).

After receiving the RACH response, the mobile device determines a mobile device power limitation, as depicted at 508. In one embodiment, this step can be implemented by determining the power headroom of the mobile device, wherein the power headroom is the difference between the power the mobile device was instructed to use in the RACH response and the maximum power of the mobile device.

Once the mobile device power limitation has been determined, the process determines a mobile device resource utilization limitation based on the power limitation, as illustrated at 510. In one embodiment, this step can be implemented by determining a maximum number of resource blocks that can be used by the mobile device in an uplink transmission based on the power headroom. For example, in one embodiment, if the mobile device has currently been instructed to transmit at 21 dBm, and the maximum power for the mobile device is 24 dBm, which makes the power headroom 3 dB, and the maximum number of resource blocks that can be used by the mobile device would be 2, since adding a second resource block requires twice the power, which is an additional 3 dB increase in power.

Next, the process determines whether the mobile device resource utilization limitation exceeds a reporting threshold, as depicted at 512. The reporting threshold can be set to a level that prevents mobile devices that are not limited by their power headroom from reporting the mobile device power limitation. Mobile devices that are not limited by their power headroom can save the bandwidth needed to report the resource utilization limitation because the scheduler in the base station (or base station controller) does not need to be concerned with limiting scheduled resources to a mobile device that is not limited by power headroom. Conversely, if a mobile device is limited by its power headroom, the scheduler needs to know, preferably in advance of scheduling, so that it will not schedule a resource allocation that will exceed the mobile device's transmit power capability.

If the resource utilization limitation exceeds the reporting threshold, the process passes to 514 wherein the process sends a synch RACH (such as sync RACH 214 shown in FIG. 4) to the base station, where in the synch RACH includes a resource allocation request and the resource utilization limitation. The resource allocation request can include a request for a file transfer, a request for a voice call, a request for a video or music file, or the like. The resource utilization limitation can include a maximum number of resource blocks, a maximum level of modulation and coding, or other similar resource limits that depend upon the mobile device transmit power. Note that in another embodiment the resource utilization limitation parameter can be transmitted on a dedicated message, and does not have to be piggy-backed on the sync RACH message.

If the resource utilization limitation does not exceed the reporting threshold, the process passes to 516 wherein the mobile device sends a synch RACH to the base station that includes a resource allocation request, but no resource utilization limitation.

After the synch RACH message is sent to the base station, the process can receive a channel sounding command, as illustrated at 518. In response to the channel sounding command, the process sends a channel sounding data sequence, as depicted 520. The channel sounding data sequence is a known data sequence, which is transmitted at a known transmit power on preselected frequencies across the bandwidth of the communication system. Channel sounding gives the base station and/or the base station controller data that represents the quality of the channel on the various frequencies across the spectrum. This information is useful in scheduling uplink transmissions from the mobile devices because the scheduler prefers to grant resources to mobile devices that are presently capable of using those resources with desirable channel conditions. In embodiments where channel sounding is not used in the system, base station 204 can infer the CINR from long term tracking of the channel through the reference symbols of the data channel.

After sending the channel sounding sequence, the process receives a dynamic or a persistent resource allocation grant, and determines whether the grant was dynamic or persistent at 522. If the grant was dynamic, the process receives instructions for a dynamic uplink transmission, including a power control instruction for use during the duration of the dynamic resource grant, as depicted at 524. The process then transmits on the uplink according to the dynamic resource allocation grant as shown at 526, and uses the power control instruction to set the transmit power for the duration of the grant. At the end of data transmission according to the dynamic resource allocation grant, the process ends as depicted at 536.

Alternatively, if the grant was persistent, the process receives instructions for a persistent uplink transmission, including an initial power control instruction to begin the persistent resource grant transmission, as illustrated at 528. The process then transmits on the uplink according to the persistent resource allocation grant, and uses the initial power control instruction to start the persistent grant transmission, as shown at 530. After a period of time, the process receives an additional power control instruction, as depicted at 532.

Next, the process determines whether the persistent grant has expired, as illustrated at 534. If the persistent grant has not expired, the process continues to send more data at 530, and periodically receives updated power control instructions at 532.

If the persistent grant has expired, the process of transmitting on the allocated uplink resource according to the persistent resource grant ends, as shown at 536.

Figure 6:
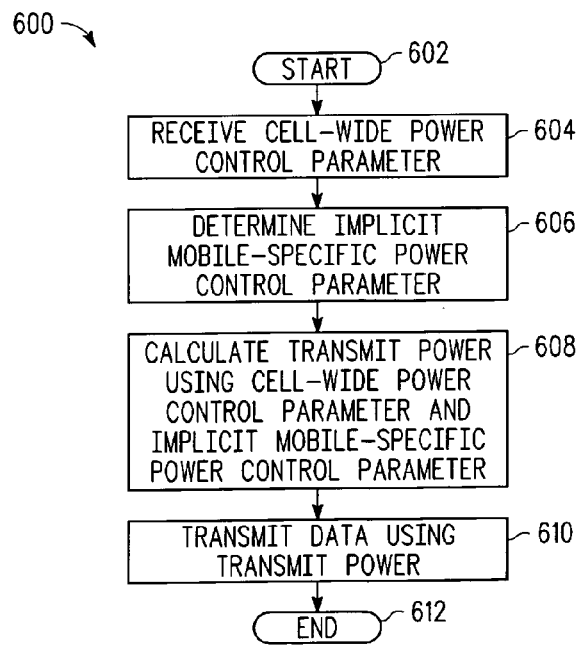
FIG. 6 is a high-level flowchart depicting a process that can be executed by a mobile device in accordance with one or more embodiments.

FIG. 6 shows a high-level flowchart of processes that can be executed by mobile device 106 in FIG. 1, or other systems with appropriate functionality, in accordance with one or more embodiments. As illustrated, the process begins at 602, and thereafter continues at 604 wherein the process receives a cell-wide power control parameter. The cell-wide power control parameter is a parameter that is sent to all mobile devices in the cell by the serving base station. The parameter can be sent by a broadcast channel. In one embodiment, the cell-wide power control parameter is a cell target signal to interference-plus-noise ratio (SINR) received at the base station (e.g., base station 102). In another embodiment, the cell-wide power control parameter can be a fractional power control exponent, which is shown as symbol "$\alpha$" in Equation 1 above.

After receiving the cell-wide power control parameter, the process determines an implicit mobile-specific power control parameter that is related to a target receive power at a serving base station, as illustrated at 606. An implicit mobile-specific power control parameter is a parameter related to uplink power control that is specific to the mobile device (i.e., a parameter that is not broadcast) and that is implied by other messages or commands sent to the mobile device, or measurements made by the mobile device, which makes the implicit parameter one that does not require additional message traffic from the base station. In one embodiment, the implicit mobile-specific power control parameter can be a modulation and coding level previously used by the mobile device. The modulation and coding level is sent to the mobile device by the base station, and it implicitly indicates the uplink channel characteristics between the mobile device and the base station. In one embodiment, the modulation and coding level previously used by the mobile device can be an average modulation and coding level averaged over a time window.

In another embodiment, the implicit mobile-specific power control parameter can be a downlink SINR level (or an averaged downlink SINR level) measured by the mobile device. In a time domain duplex (TDD) communication system, by the reciprocity principle, the downlink SINR implicitly indicates the uplink channel characteristics. In a frequency domain duplex (FDD) communication system, the uplink and downlink channel fast fading components may be uncorrelated even though the pathloss and shadowing components are identical. Averaging the downlink SINR over time and frequency will average out the fading components and provide a good implicit estimate of the uplink channel characteristics.

In some embodiments, the mobile device can also receive a mobile-specific power control parameter, in addition to the cell-wide power control parameter and the implicit mobile-specific power control parameter. The mobile-specific power control parameter can be received in a message from the base station that is directed specifically to the mobile device. In the case where the mobile device receives a cell-wide power control parameter and a mobile-specific powerful parameter, the implicit mobile-specific power control parameter can be a correlation between the mobile-specific power control parameter and a modulation and coding level assigned by the serving base station. Thus, the implicit mobile-specific power control parameter can vary between the case where the mobile-specific power control parameter correlates directly with the modulation and coding scheme and in the case where the mobile-specific power control parameter correlates in directly with the modulation and decoding scheme. As an example, a direct correlation between the power control parameter and the modulation and coding scheme is where the mobile device receives a relatively high power in combination with a relatively high modulation and coding level (i.e., a modulation and coding level that requires a higher power), and similarly the case where the mobile device receives a relatively low power in combination with a relatively low modulation and coding level. An example of an indirect correlation between the power control parameter and the modulation and coding scheme is where the mobile device receives a relatively high power in combination with a relatively low modulation and coding scheme, and vice versa. Thus, this implicit mobile-specific correlation factor varies between expected power levels and modulation and coding schemes, and unexpected combinations of power level and modulation and coding schemes.

Next, the process calculates the mobile device uplink transmit power using the cell-wide power control parameter and the implicit mobile-specific power control parameter, as depicted at 608. In this step, the implicit mobile-specific power control parameter is used to adjust a transmitter power indicated by the cell-wide power control parameter, or to adjust a transmit power indicated by the cell-wide power control parameter in combination with a mobile-specific power control parameter. In one embodiment, this adjustment can be a percentage of the transmit power indicated by calculations using cell-wide parameters, or by calculations using cell-wide parameters in combination with mobile-specific parameters.

As an example, assume that the base station broadcasts a cell-wide target SINR that maps to an average MCS level of 16 QAM (i.e., 16 point constellation, quadrature amplitude modulation) ($SINR_{16}$) with coding rate ½. The mobile device will first calculate its transmit power to ensure that its signal is received at the base station with the cell-wide target $SINR_{16}$. Then, the mobile device can autonomously calculate a correction factor based upon an implicit mobile-specific power control parameter, such as a history of uplink MCS allocated to the mobile device. If the mobile device observes that its average MCS level allocated over time and frequency is 4 QAM rate ½, which maps to an average SINR received at the base station of $SINR_4$, a correction factor of $SINR_{16}$-$SINR_4$ can be autonomously applied by the mobile device to bring it in line with the expected received $SINR_{16}$ at the base station. Thus, the difference between the target SINR and the implied SINR determines the addition (if the measured MCS implies a lower SINR at the base station) or subtraction (if the measured MCS implies a higher SINR at the base station) of an autonomous correction factor.

In one embodiment, the difference (i.e., the correction factor) can be applied directly to the transmit power at one time. In another embodiment the correction factor can be incrementally applied over a period, either by applying a number of fixed incremental corrections (e.g., change by 1 dB), or by applying a percentage of the correction factor over a fixed number of corrections (e.g., change by 20% of the correction factor over 5 changes). The correction factor can be periodically recalculated, even before a previous correction factor is completely applied.

Furthermore, the mobile device can make continuous measurements on the downlink SINR levels and average the measurements over time and frequency to estimate a long term downlink received SINR. This estimated long term SINR can then be compared to the uplink SINR the mobile device expects based on the autonomously corrected transmit power as calculated in the example above. A delta correction factor can be calculated and applied based on the difference, and the delta correction factor can then be used in the calculation of the autonomous correction factor to increase its accuracy. The delta correction factor can be used to compensate for inaccuracies in transmit power, which are due to a difference in a set transmit power and an actual transmit power in the mobile device.

After calculating the mobile device uplink transmit power, the mobile device transmits data using the transmit power, as illustrated at 610. The data is transmitted on the time and frequency indicated by a resource allocation grant. After transmitting the data using the calculated transmit power, the process ends at 612.

If the mobile device has been granted a resource allocation that cannot be fulfilled in the transmission at 612 because of power limitations in the mobile device (e.g., a combination of transmit power and MCS cannot be achieved because the combination exceeds the maximum power of the mobile device), the mobile device has several options: (1) the mobile device can transmit using a lower power; (2) the mobile device can transmit using a lower MCS level; (3) the mobile device can transmit on a reduced number of resource blocks; (4) the mobile device can repeat the request for resource allocation (e.g., repeat the synch RACH message 214), wherein the repeated request includes an indication of the resource utilization limitation (e.g., 308), which limitation caused the previous grant to exceed the mobile device power limitation.

Although the invention is described herein with reference to specific embodiments, various modifications and changes can be made without departing from the scope of the present invention as set forth in the claims below. For example, while the techniques and apparatus for controlling a transmit power in a mobile device may vary widely, one or more embodiments can be used in a system operating according to the 3GPP LTE standard. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling power transmitted by a mobile device comprising:
   at the mobile device:
   sending a resource allocation request from the mobile device to a base station,
   wherein, when a resource utilization limitation of the mobile device exceeds a reporting threshold, the resource allocation request comprises a maximum number of resource blocks based on one or more of a current power level and a current modulation and coding scheme (MCS);
   after sending the resource allocation request, receiving a dynamic resource allocation grant from the base station, wherein the dynamic resource allocation grant includes a power control instruction for use during the duration of the dynamic resource allocation grant;
   wherein the receiving the dynamic resource allocation grant comprises receiving a dynamic resource allocation grant that includes an allocation of a number of resource blocks associated with an allocation bandwidth, and the power control instruction comprises an instruction to use a dynamic grant transmit power; and
   when the allocated number of resource blocks exceeds the maximum number of resource blocks, automatically reducing a transmit power.

2. The method according to claim 1 further comprising:
   receiving a channel sounding request from the base station; and
   transmitting channel sounding data in response to the channel sounding request.

3. The method according to claim 1 wherein the receiving the dynamic resource allocation grant comprises receiving a dynamic resource grant that grants resources within a mobile device resource limit, wherein the mobile device resource limit is related to a mobile device power limitation.

4. The method according to claim 1 wherein further comprising:
   sending a second resource allocation request from the mobile device to the base station;
   receiving a persistent resource allocation grant from the base station, wherein the persistent resource allocation grant includes a second power control instruction for initial use during the persistent resource allocation grant; and
   receiving subsequent power control instructions during the duration of the persistent resource allocation grant.

5. The method according to claim 4 wherein the receiving subsequent power control instructions during the duration of the persistent resource allocation grant comprises receiving subsequent power adjustment instructions during the duration of the persistent resource allocation grant, wherein the instructions include one of an instruction to increment power and an instruction to decrement power.

6. A method for controlling power transmitted by a mobile device comprising:
   at the mobile device:
   sending resource allocation requests from the mobile device to a base station, where the resource allocation requests are based at least in part on power consumption requirements of the mobile device wherein, when a resource utilization limitation of the mobile device exceeds a reporting threshold, the resource allocation request comprises a maximum number of resource blocks based on one or more of a current power level and a current modulation and coding scheme (MCS);
   after sending the resource allocation requests, receiving resource allocation grants from the base station;
   when a given resource allocation grant is a dynamic resource allocation grant, executing a dynamic power control instruction comprised in the resource allocation grants during the duration of the dynamic resource allocation grant;
   when a given resource allocation grant is a persistent resource allocation grant, executing an initial power control instruction comprised in the resource allocation grants for initial use during the persistent resource allocation grant, and receiving subsequent power control instructions during the duration of the persistent resource allocation grant; and
   when an allocated number of resource blocks exceeds a maximum number of resource blocks, automatically reducing a transmit power.

7. The method according to claim 6, further comprising:
   receiving a channel sounding request from the base station; and
   transmitting channel sounding data in response to the channel sounding request.

8. The method according to claim 6, wherein the receiving the resource allocation grant comprises receiving a resource allocation grant that grants resources within a mobile device resource limit, wherein the mobile device resource limit is related to a mobile device power limitation.

9. A mobile device, comprising:
   a wireless interface;
   a processor;
   a non-transitory computer-readable medium in data communication with the wireless interface and the processor and comprising instructions which when executed by the processor to:
   determine a maximum number of resource blocks the device can transmit based on one or more of a current power level and a current modulation and coding scheme;
   report the maximum number of resource blocks to a base station when the maximum number of resource blocks exceeds a reporting threshold;

after reporting the maximum number of resource blocks,
receive a resource block allocation from the base station; and automatically reduce a transmit power for the resource block allocation when the received resource block allocation exceeds the maximum number of resource blocks.

10. The mobile device according to claim 9, wherein the instructions are further executable to:

receive a channel sounding request from the base station; and transmit channel sounding data in response to the channel sounding request.

11. The mobile device according to claim 9, wherein the receiving the resource block allocation comprises receiving a resource block allocation that grants resources within a mobile device resource limit, wherein the mobile device resource limit is related to a mobile device power limitation.

* * * * *